(12) United States Patent
Kim et al.

(10) Patent No.: US 10,736,457 B2
(45) Date of Patent: Aug. 11, 2020

(54) ELECTRIC COOKER

(71) Applicant: CUCKOO ELECTRONICS CO., LTD., Yangsan-si (KR)

(72) Inventors: Won Young Kim, Busan (KR); Seung Yun Kim, Busan (KR); Soo Ho Son, Busan (KR); Ho Sang Bang, Busan (KR); Young Bae Shin, Yangsan-si (KR)

(73) Assignee: CUCKOO ELECTRONICS CO., LTD., Yangsan-si (KR)

( * ) Notice: Subject to any disclaimer, the term of this patent is extended or adjusted under 35 U.S.C. 154(b) by 253 days.

(21) Appl. No.: 16/012,853

(22) Filed: Jun. 20, 2018

(65) Prior Publication Data

US 2019/0008310 A1  Jan. 10, 2019

(30) Foreign Application Priority Data

Jul. 10, 2017 (KR) .................. 10-2017-0087328

(51) Int. Cl.
| | | |
|---|---|---|
| *A47J 27/09* | (2006.01) | |
| *A47J 27/08* | (2006.01) | |
| *A47J 27/00* | (2006.01) | |
| *A47J 27/086* | (2006.01) | |

(52) U.S. Cl.
CPC ............. *A47J 27/09* (2013.01); *A47J 27/004* (2013.01); *A47J 27/0802* (2013.01); *A47J 27/086* (2013.01); *A47J 27/0813* (2013.01)

(58) Field of Classification Search
CPC ...... A47J 27/09; A47J 27/0802; A47J 27/004; A47J 27/0813; A47J 27/086

USPC .................................. 99/332, 337, 339, 358
See application file for complete search history.

(56) References Cited

U.S. PATENT DOCUMENTS

2015/0351578 A1* 12/2015 Song ..................... A47J 27/09
                                                        99/358
2016/0345766 A1* 12/2016 Sapire .................. A47J 27/0815

FOREIGN PATENT DOCUMENTS

| CN | 101554288 | 10/2009 |
|---|---|---|
| JP | 2012-157757 | 8/2012 |
| KR | 10-2004-0077305 | 9/2004 |
| KR | 10-2006-0016070 | 2/2006 |
| KR | 20-0445013 | 6/2009 |

(Continued)

*Primary Examiner* — Thien S Tran
(74) *Attorney, Agent, or Firm* — Lex IP Meister, PLLC

(57) ABSTRACT

An electric cooker is configured to cook in a pressure state and a non-pressure state of an inner pot, thereby improving the cooking quality and convenience of use. The electric cooker includes a main body provided, at an upper end thereof, with a flange portion and configured to accommodate an inner pot therein; a lid coupled to an upper portion of the main body and opened/closed by an opening/closing unit; a locking ring rotated by interworking with the opening/closing unit, selectively engaged with the flange portion, and provided, at an upper surface thereof, with a marker configured to indicate a rotational direction; a pressure switching unit arranged to pass through the lid and opened or closed by interworking with the opening/closing unit to discharge internal steam from the inner pot; a sensor unit configured to sense the marker when the locking ring is rotated to be locked or unlocked; and a control unit that activates power supply to the main body when a sensing signal is received from the sensor unit.

16 Claims, 5 Drawing Sheets

(56) References Cited

FOREIGN PATENT DOCUMENTS

KR  10-1731601  5/2017

* cited by examiner

ELECTRIC COOKER

CROSS-REFERENCE TO RELATED APPLICATION

This application claims the benefit of Korean Application No. 10-2017-0087328 which was filed on Jul. 10, 2017, which was hereby incorporated by reference as if fully set forth herein.

BACKGROUND

1. Field of the Invention

The present disclosure relates to an electric cooker, and more specifically, to an electric cooker configured to cook in a pressure state and a non-pressure state of an inner pot, thereby improving the cooking quality and convenience of use.

2. Discussion of Related Art

In general, an electric cooker refers to an electric rice cooker, an electric pressure cooker, or the like used for cooking food in a restaurant or at home, and includes a main body having a heating unit and a lid covering a top of the main body.

An inner pot for receiving food is accommodated in the main body, the lid is hinged to one side of the main body such that the lid can be opened and closed, and an inner pot cover is provided at a bottom of the lid to seal an opening of the inner pot. A flow hole configured to communicate with an inside of the inner pot may be formed at one side of the inner pot cover, and steam generated in the inner pot may flow to a pressure-adjusting unit provided in the lid through the flow hole.

In detail, the pressure-adjusting unit may include a solenoid valve electrically driven to open or close a steam discharge passage that connects the inside of the inner pot to the outside of the cooker, and a pressure relief valve for maintaining an internal pressure of the inner pot at a predetermined level. That is, when the cooking is started, the steam discharge passage is closed by the solenoid valve so that the internal pressure of the inner pot is increased, and the internal pressure of the inner pot can be maintained at a predetermined level through the pressure relief valve.

However, since the conventional electric cooker maintains the internal pressure of the inner pot at a predetermined level throughout the interaction between a weight pressure of the pressure relief valve and a steam pressure, it is difficult to select a cooking mode suitable for a user's taste or the type of foodstuffs and thus the cooking quality is degraded.

That is, in the case of a food material which does not need to be pressurized, there is a problem wherein the texture of food is softened due to the high pressure. Meanwhile, when non-pressurized rice having a soft texture is preferred more than pressurized rice having a sticky texture, there is a problem wherein it is necessary to separately cook a food by using a non-pressure electric rice cooker or a common pot.

That is, in the case of a food material which does not need to be pressurized, there is a problem wherein the texture of food is softened due to the high pressure. Meanwhile, when non-pressure cooked rice having a soft texture is preferred more than pressure cooked rice having a sticky texture, there is a problem wherein it is necessary to separately cook a food by using a non-pressurized electric rice cooker or a common pot.

Thus, in order to provide the rice having the soft texture, the solenoid valve is frequently opened for a predetermined time/cycle in the cooking process, the thermal power is reduced or the rice is soaked in water for a long time. However, the taste of the rice does not reach the level of the taste of rice cooked with the non-pressure electric rice cooker.

SUMMARY OF THE INVENTION

The present disclosure is directed to an electric cooker configured to cook a food in a pressure state and a non-pressure state of an inner pot, thereby improving the cooking quality and convenience of use.

According to an aspect of the present disclosure, there is provided an electric cooker including: a main body provided, at an upper end thereof, with a flange portion and configured to accommodate an inner pot therein; a lid coupled to an upper portion of the main body and opened/closed by an opening/closing unit; a locking ring rotated by interworking with the opening/closing unit, selectively engaged with the flange portion, and provided, at an upper surface thereof, with a marker configured to indicate a rotational direction; a pressure switching unit arranged to pass through the lid and opened or closed by interworking with the opening/closing unit to discharge internal steam from the inner pot; a sensor unit configured to sense the marker when the locking ring is rotated to be locked or unlocked; and a control unit that activates power supply to the main body when a sensing signal is received from the sensor unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Exemplary embodiments of the present disclosure will be described in detail below with reference to the accompanying drawings. While the present disclosure is shown and described in connection with the exemplary embodiments, it will be apparent to those skilled in the art that various modifications can be made without departing from the spirit and scope of the disclosure.

Hereinafter, an electric cooker according to an exemplary embodiment of the present disclosure will be described in detail with reference to the accompanying drawings.

Figure 1:
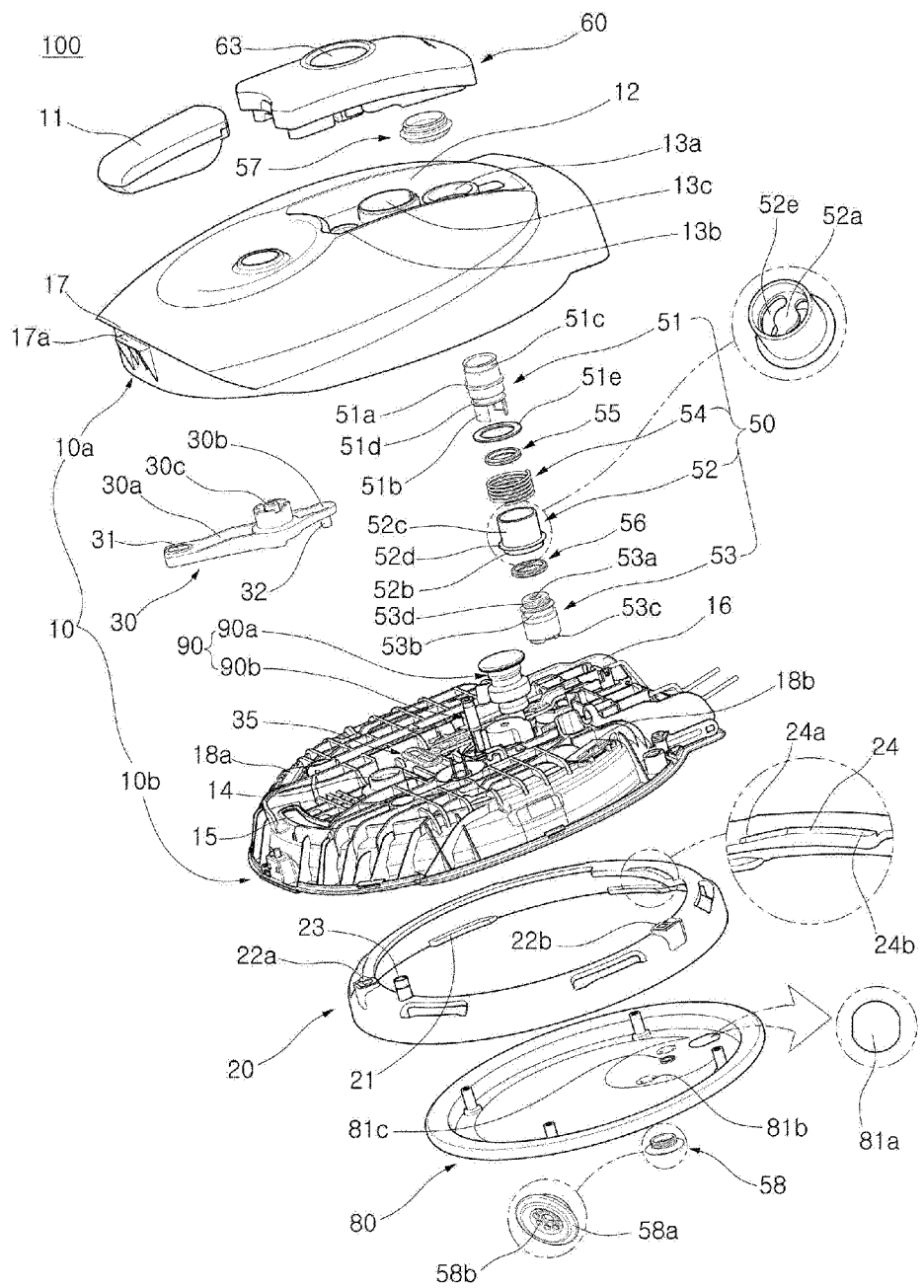
FIG. 1 is an exploded perspective view illustrating a lid of an electric cooker according to a first embodiment of the present disclosure.
Figure 2A:
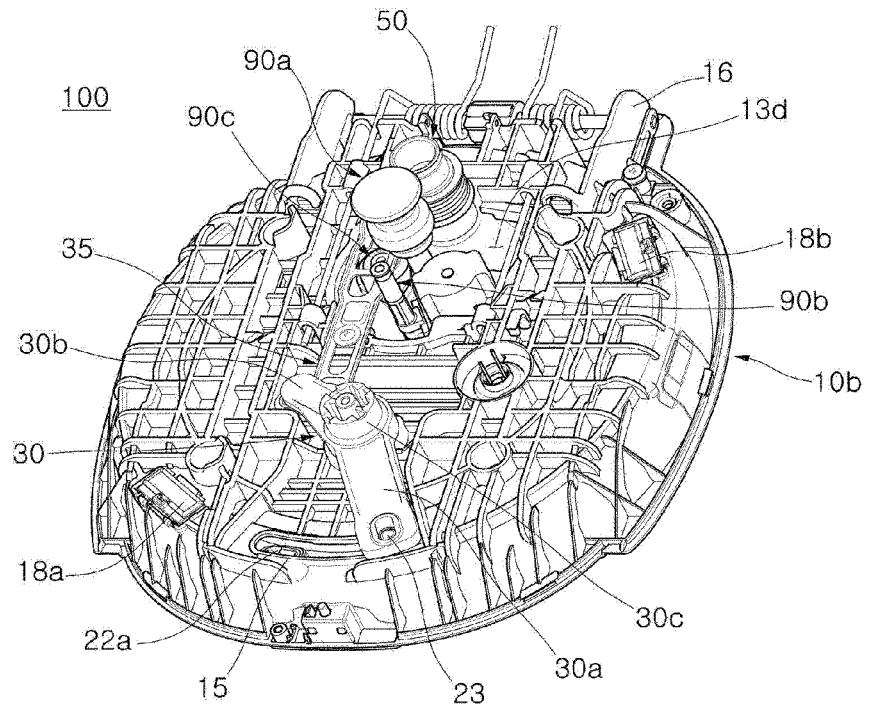
FIGS. 2A and 2B are perspective views illustrating opened and closed states of a pressure switching unit of the electric cooker according to the first embodiment of the present disclosure.
Figure 2B:
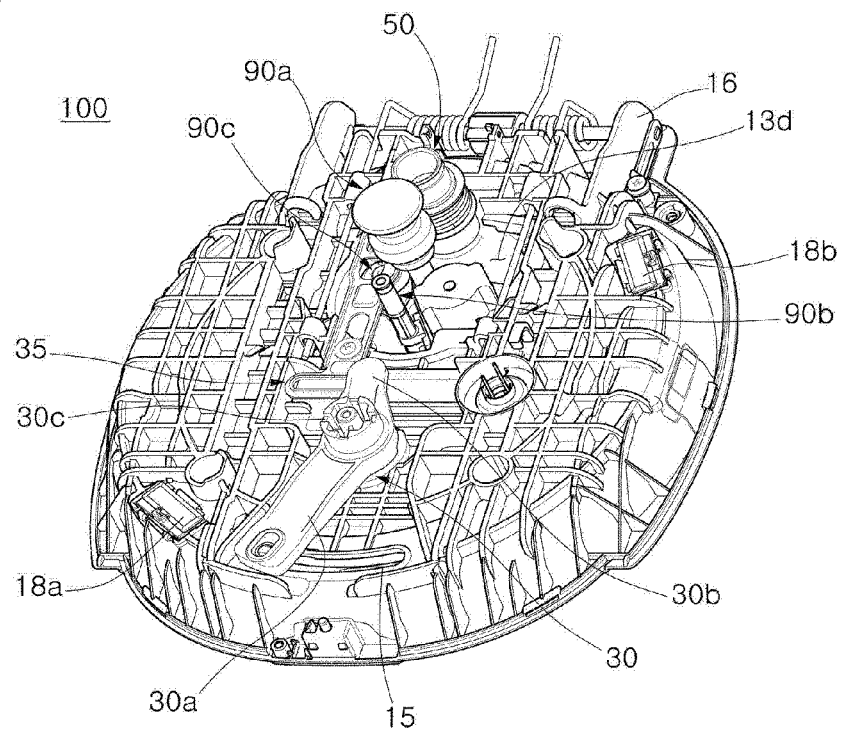
Figure 3A:
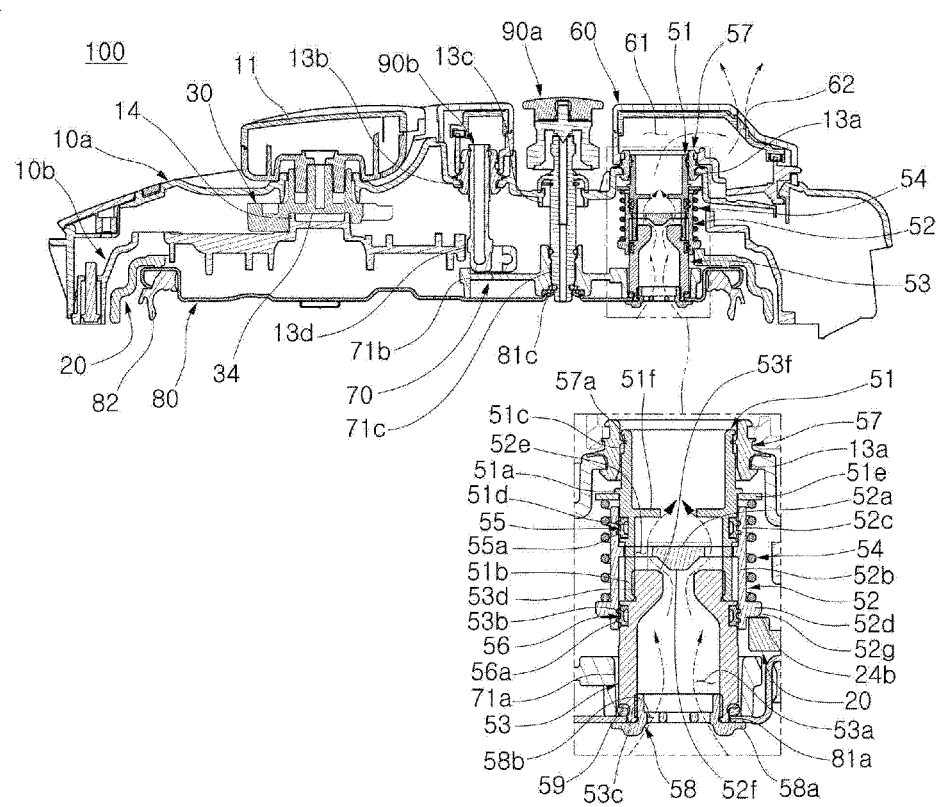
FIGS. 3A and 3B are sectional views illustrating opened and closed states of the pressure switching unit of the electric cooker according to the first embodiment of the present disclosure.
Figure 3B:
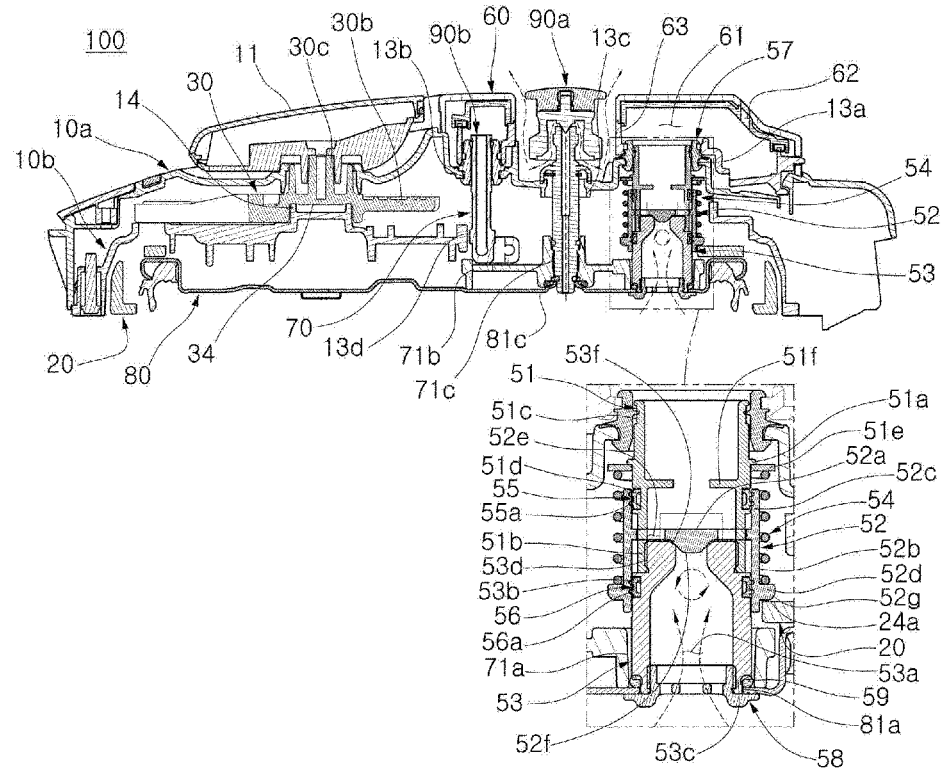
Figure 4:
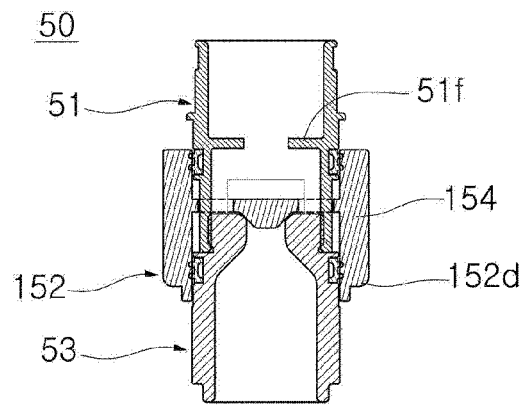
FIG. 4 is a view illustrating a modified example of a pressing unit of the electric cooker according to the first embodiment of the present disclosure.
Figure 5:
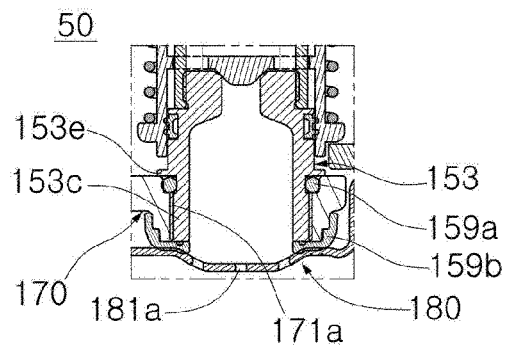
FIG. 5 is a view illustrating a modified example of a coupling structure of a lower cylinder of the electric cooker according to the first embodiment of the present disclosure.
Figure 6:
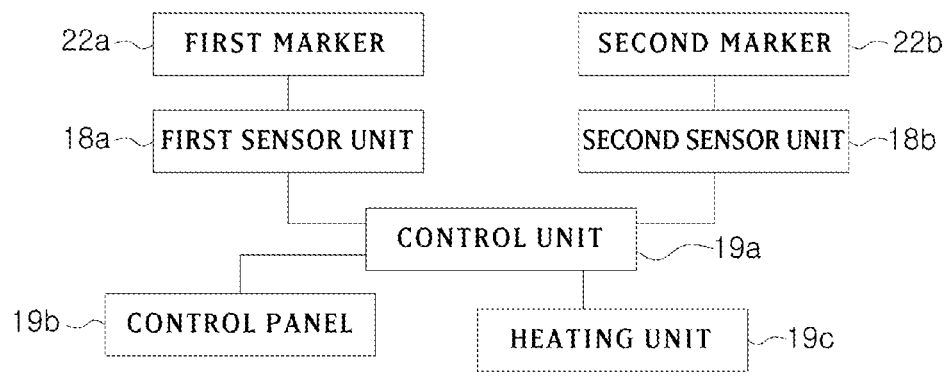
FIG. 6 is a block diagram illustrating the electric cooker according to the first embodiment of the present disclosure.

FIG. 1 is an exploded perspective view illustrating a lid of an electric cooker according to a first embodiment of the present disclosure, FIGS. 2A and 2B are perspective views illustrating opened and closed states of a pressure switching unit of the electric cooker according to the first embodiment of the present disclosure, FIGS. 3A and 3B are sectional views illustrating opened and closed states of the pressure switching unit of the electric cooker according to the first embodiment of the present disclosure, FIG. 4 is a view illustrating a modified example of a pressing unit of the electric cooker according to the first embodiment of the present disclosure, FIG. 5 is a view illustrating a modified example of a coupling structure of a lower cylinder of the electric cooker according to the first embodiment of the present disclosure, and FIG. 6 is a block diagram illustrating the electric cooker according to the first embodiment of the present disclosure.

As shown in FIGS. 1 to 6, an electric cooker 100 according to the embodiment of the present disclosure includes a main body (not shown), a lid 10, a locking ring 20, a pressure switching unit 50, a pressure-responsive operating unit 90, sensor units 18a and 18b, and a pressure switching unit 50.

A mounting space is formed in the main body (not shown) and a heating unit 19c such as a heat plate heater or an induction heating unit is provided in the mounting space. An inner pot (not shown) for receiving foods is mounted in the mounting space. A plurality of flange portions protrude radially outward from an upper end of the inner pot (not shown).

Meanwhile, referring to FIGS. 1 and 2A, the lid 10 is coupled to an upper portion of the main body (not shown) so as to be opened and closed and includes an inner lid portion 10b in which various electrical components and wirings are installed, and an outer lid portion 10a covering the inner lid portion 10b and having a handle portion 11 at one side of an upper surface thereof. The handle portion 11 is illustrated as an example of an opening/closing unit. That is, the handle portion may be replaced with or may include an electric motor which interworks with a locking ring to lock the inner pot by the user's manipulation.

In the following description, one side may refer to a direction toward an open end 17 of the lid 10 and the other side refers to a direction toward a hinge connection part 16 of the lid 10.

In addition, the locking ring 20 is rotatably coupled to a lower surface of the inner lid portion 10b and selectively locked to the flange portion depending on a rotational angle thereof.

In detail, a plurality of locking protrusions 21 protrude radially inward from an inner periphery of the locking ring 20 to correspond to the flange portions, respectively. In this case, when the locking ring 20 is rotated at an unlocking angle, each locking protrusion 21 is disposed in a space between the flange portions, and the lid 10 is separated from the inner pot (not shown) so that the lid 10 may be opened. In addition, when the locking ring 20 is rotated at a locking angle in a state that the lid 10 is closed, each locking protrusion 21 is restrained by a lower end of the flange portion so that the lid 10 is locked with the inner pot (not shown).

In addition, markers 22a and 22b, such as permanent magnets for indicating a rotational direction, may be provided on an upper surface of the locking ring 20 and sensor units 18a and 18b are provided on the inner lid portion 10b to sense the markers 22a and 22b.

The sensor 18a and 18b may be provided as magnetic force detecting sensors configured to transmit a sensing signal by sensing the magnetic force of the adjacent markers 22a and 22b when the locking ring 20 rotates, and the control unit 19a receives the sensing signal of the sensor units 18a and 18b to determine the locked and unlocked states of the locking ring 20.

One or two markers 22a and 22b may be provided, and a pair of sensor units 18a and 18b may be provided to sense the locked and unlocked states of the locking ring 20, respectively.

For example, when the number of the marker is one, the sensor units 18a and 18b are disposed corresponding to the position of the marker when the locking ring 20 is locked and the position of the marker when the locking ring 20 is unlocked. In this case, the marker may be alternately sensed by the sensor units 18a and 18b when the locking ring 20 is locked and unlocked.

In addition, when two markers are provided, the sensor units 18a and 18b sense the position of a first marker 22a when the locking ring 20 is locked and the position of a second marker 22a when the locking ring 20 is unlocked 22b, respectively. In this case, the markers can be selectively sensed by the sensor units 18a and 18b located at positions corresponding to locked and unlocked states of the locking ring 20.

Referring to FIGS. 1 to 3A, a handle base portion 30 is connected to a lower end of the handle portion 11. In detail, the handle base portion 30 includes a support portion 30c as well as a locking ring interworking portion 30a and a safety bar interworking portion 30b which protrude from one end and the other end of the support portion 30c, respectively. The lower end of the handle portion 11 is coupled to an upper surface of the support portion 30c by means of a key, and a support protrusion 14 of the inner lid portion 10b is inserted into a rotation support groove 34 formed in a lower surface of the support portion 30c and rotatably supported therein. Accordingly, the handle base portion 30 can be rotated integrally with the handle portion 11 without twisting.

In addition, the locking ring interworking portion 30a extends to overlap with a rotational trace of the locking ring 20, and a connection hole 31 is formed in one side of the locking ring 20 overlapping with the locking ring 20. In this case, a connection protrusion 23 protruding from an upper surface of the locking ring 20 is inserted into the connection hole 31 through an arc-shaped elongated hole 15 of the inner lid portion 10b, so that the locking ring 20 can be rotated together with the handle portion 11.

Further, a safety bar 35 is connected to a safety bar interworking portion 30b. The safety bar 35 linearly moved to one side and the other side when the handle base portion 30 is rotated and the linear movement of the safety bar 35 is selectively restricted by a pressure safety device 90c.

In detail, when the inner pressure of the inner pot is increased to a preset safety pressure or above, a safety pin of the pressure safety device 90c moves upward to restrain the safety bar 35 so that the linear movement of the safety bar 35 is restricted.

Accordingly, the rotation of the handle base portion 30 connected to the safety bar 35 is restricted, so that the locking ring 20 can be prevented from being unlocked when the inner pot is in a high pressure state.

Meanwhile, a lead plate 80 is coupled to a lower surface of the inner lid portion 10*b* and an inner pot cover may be additionally attached to a lower surface of the lead plate 80.

In the present embodiment, as an example, a sealing packing 82 configured to seal an upper opening of the inner pot (not shown) is provided on the lower surface of the lead plate 80. However, the sealing packing 82 may be provided on an edge of an inner pot cover (not shown).

A plurality of steam flow holes are formed to pass through the other side of the inner pot cover (not shown) to discharge steam inside the inner pot, and a plurality of communication holes 81*a*, 81*b*, and 81*c* are formed to pass through the lead plate 80 in a region facing the steam flow holes.

In addition, a control plate 70 having mounting holes 71*a*, 71*b* and 71*c* formed to pass therethrough and corresponding to the communication holes 81*a*, 81*b* and 81*c* is provided between the lead plate 80 and the inner lid portion 10*b* to collectively cover the communication holes 81*a*, 81*b* and 81*c*. Alternatively, the control plate 70 may be integrally formed with the lead plate 80.

Meanwhile, a plurality of upper perforation portions 13*a*, 13*b* and 13*c* are formed in the other side of the outer lid portion 10*a* to respectively correspond to the mounting holes 71*a*, 71*b* and 71*c*, and a lower perforation portion 13*d* having a size capable of covering a region of the upper perforation portions 13*a*, 13*b* and 13*c* is formed in the inner lid portion 10*b*.

In this case, the pressure switching unit 50 is arranged to pass through the lid 10 via one of the upper perforation portions 13*a*, 13*b*, and 13*c* and the lower perforation portion 13*d* such that the opened or closed state for discharging the steam can be selectively maintained. That is, the pressure switching unit 50 is configured to continuously maintain one of the opened and closed states during the cooking process.

In detail, the pressure switching unit 50 includes a communication member for communicating the inside of the inner pot with the outside, and an opening/closing member for maintaining the communication member in one of the opened/closed states by a pressure in the first direction. In the following description, the first direction may refer to a direction from an upper side to a lower side as an example, and the first direction may be variously changed as a direction from a lower side to an upper side, from a left side to a right side or from a right side to a left side.

In this case, the opening/closing member may be configured to maintain the communication member in an opened state by the pressure in the first direction, or to maintain the communication member in a closed state.

Further, opened/closed states of the opening/closing member may be switched by a link unit that generates a pressure in a second direction opposite the first direction when the handle portion 11 rotates. When the pressure in the first direction maintains the opening/closing member in the opened state, the pressure in the second direction switches the opening/closing member into the closed state. In addition, when the pressure in the first direction maintains the opening/closing member in the closed state, the pressure in the second direction switches the opening/closing member into the opened state. Thus, the opened/closed states of the pressure switching unit 50 can be switched corresponding to the rotation of the handle portion 11.

In the following description, as an example, the link unit will be described as a lift protrusion portion 24 of the locking ring 20 interworking with the handle portion 11. The link unit may be integrally provided with the handle portion 11, or may be provided on the handle base portion 30 interworking with the handle portion 11.

In addition, in the present embodiment, the communication member is provided as a lower cylinder 53 and an upper cylinder 51 to form an internal passage for communicating the inside of the inner pot with the outside, and the opening/closing member is provided as a lifting piston 52 which vertically moves between the lower cylinder 53 and the upper cylinder 51 to switch the opened/closed states of the internal passage.

In this case, the lifting piston 52 is pressed down by a pressing unit to close the internal passage, and the link unit is provided as a protrusion integrally formed with the locking ring 20 to press the lifting piston 52 upward when the handle portion rotates.

In addition, the pressure-responsive operating unit 90 is arranged to pass through the lid 10 via the remaining upper perforation portions 13*b* and 13*c* and lower perforation portion 13*d* where the pressure switching unit 50 is not disposed.

The pressure-responsive operating unit 90 includes a solenoid valve 90*b* that is opened or closed in response to an electrical signal, and a pressure relief valve 90*a* having a weight that is vertically lifted according to the steam pressure inside the inner pot and selectively opened or closed depending on a pressure level in the inner pot in the pressure cooking mode in which the pressure switching unit 50 is closed.

That is, when the handle portion 11 rotates to unlock the locking ring 20, the pressure switching unit 50 is opened, so that the cooking is performed in a non-pressure cooking mode in which the steam in the inner pot is continuously discharged during the cooking.

An internal flow path of the pressure switching unit 50 may have a sectional area having a size that does not generate pressure in the inner pot by discharging all the steam generated during the cooking.

When the handle portion 11 is rotated so as to lock the locking ring 20, the pressure switching unit 50 is closed and the internal pressure of the inner pot is maintained at a constant level by the pressure-responsive operating unit 90 so that the cooking can be performed in the pressure cooking mode.

Meanwhile, referring to FIGS. 1 to 6, the control unit 19*a* controls to activate power supply to the main body (not shown) when the control unit 19*a* receives the sensing signal from at least one of the sensor units 18*a* and 18*b*.

In detail, one sensor unit 18*a* is disposed corresponding to the position of the first marker 22*a* in the locking rotational direction of the locking ring 20 when the locking ring 20 is locked and the other sensor 18*b* is disposed corresponding to the position of the second marker 22*b* in the unlocking rotational direction when the locking ring 20 is unlocked.

In this case, when the locking ring 20 is rotated to be locked, the pressure switching unit 50 is closed and the first sensor unit 18*a* senses the magnetic force of the first marker 22*a* and transmits a sensing signal. When the locking ring 20 is rotated to be unlocked, the pressure switching unit 50 is opened and the second sensor unit 18*b* senses the magnetic force of the second marker 22*b* to transmit a sensing signal.

The control unit 19*a* may activate the power supply to the main body (not shown) when one of the sensing signals of the first sensor unit 18*a* and the second sensor unit 18*b* is received. As the power supply to the main body (not shown) is activated, the heating unit 19*c* may be driven to heat the inner pot according to the cooking command input through the control panel 19b of the main body.

Accordingly, the heating unit 19c can be driven not only in the pressure cooking mode in which the locking ring 20 is locked, but also in the non-pressure cooking mode in which the locking ring 20 is unlocked, so that the food in the inner pot can be cooked.

The control unit 19a deactivates the power supply to the main body (not shown) when the sensing signal is not received. The deactivation signifies that the heating unit 19c is not driven even when the cooking command is input. In addition, no-receipt of the sensing signal signifies that the markers 22a and 22b are not sensed by the sensor units 18a and 18b. Thus, the power supply to the main body (not shown) can be activated only when the pressure switching unit 50 is completely closed due to the locking of the locking ring 20 or when the pressure switching unit 50 is completely opened due to the unlocking of the locking ring 20.

That is, the cooking is not performed when the pressure switching unit 50 is partially opened or closed, so that the degradation of cooking quality and occurrence of accidents caused when the pressure switching unit 50 is partially opened can be prevented.

In addition, the control unit 19a can control the cooking temperature of the inner pot through the control algorithm of the preset pressure cooking mode when the cooking command is input in a state that the sensing signal corresponding to the locking of the locking ring 20 is received. In this case, the control unit 19a can control the amount of heating of the heating unit 19c to maintain the cooking temperature suitable for the pressure cooking for the pressure cooked rice and the like.

Further, the control unit 19a may control the amount of heating of the heating unit through the control algorithm of the preset non-pressure cooking mode when the cooking command is input in a state that the sensing signal corresponding to the unlocking of the locking ring 20 is received. In this case, the control unit 19a can control the amount of heating of the heating unit 19c to maintain the cooking temperature suitable for the non-pressure cooking for the non-pressure cooked rice and the like.

Therefore, the locked/unlocked states of the locking ring 20 and the opened/closed states of the pressure switching unit 50 can be switched by simply rotating the handle portion 11, and a cooking temperature control algorithm suitable for the switched pressure or non-pressure cooking mode can be automatically selected, so that the convenience of use for the product and the cooking quality can be remarkably improved.

Meanwhile, a mounting groove 12 is recessed in an upper surface of the outer lid portion 10a along edges of the upper perforation portions 13a, 13b and 13c and a steam cap portion 60 configured to guide the discharge of steam from the pressure-responsive operating unit 90 and the pressure switching unit 50 may be detachably mounted in the mounting groove 12.

The steam cap portion 60 is formed, at one side thereof, with a weight receiving hole 63 configured to surround an outer periphery of the pressure relief valve 90a and formed therein with a guide space 61 where upper ends of the pressure switching unit 50 and the solenoid valve 90b are disposed.

In this case, the steam of the pressure relief valve 90a collides with an inner wall surface of the weight receiving hole 63 and is discharged to the outside while being decelerated. In addition, the steam of the pressure switching unit 50 and the solenoid valve 90b collides with a flow control ribs (not shown) protruding into the guide space 61 and is discharged to the outside through a stem guide hole 62 formed in the other end of the guide space 61 while being decelerated. As a result, accidents such as burns due to the rapid discharge of the high-temperature/high-pressure steam, and steam emission noise can be minimized.

The main body (not shown) may be provided with an auxiliary locking unit for locking a locking protrusion 17a protruding from an open end 17 of the lid 10. Thus, the closed state of the lid 10 can be stably maintained when the locking ring 20 is unlocked even in the non-pressure cooking mode in which the pressure switching unit 50 is opened. Accordingly, the lid 10 can be prevented from being opened or disturbed due to the steam pressure during the cooking so that the inner pot (not shown) and the inner pot cover can be maintained in close contact with each other. Thus, the steam in the inner pot can be safely discharged through the pressure switching unit 50 and the steam cap portion 60.

Referring to FIGS. 1 to 3A, the pressure switching unit 50 may include a lower cylinder 53, a lifting piston 52, an upper cylinder 51, and a pressing unit.

The lower cylinder 53 has a hollow cylindrical shape and a pressure switching passage 53a is formed in the lower cylinder 53. The lower cylinder 53 is disposed to pass through the lower perforation portion 13d. As a lower end of the lower cylinder 53 is closely coupled to the communication hole 81a, the pressure switching passage 53a communicates with an inner side of the inner pot.

In detail, a D-cut coupling portion 53c is formed at a lower end of the lower cylinder, and the communication hole 81a facing the lower cylinder 53 may be configured as a D-cut hole having a D-cut section corresponding to the D-cut coupling portion 53c. Accordingly, an outer periphery of the D-cut coupling portion 53c is matched with and supported on the inner periphery of the D-cut hole, so that the rotation of the lower cylinder 53 caused by the steam pressure can be prevented.

In this case, the D-cut coupling portion 53c is inserted into the D-cut hole in a state that a sealing O-ring 59 is fitted onto the outer periphery of the D-cut coupling portion 53c, and a screw thread is formed on an inner periphery of the D-cut coupling portion 53c being inserted into the D-cut hole so that the D-cut coupling portion 53c can be screw-coupled with an outer periphery of a cylinder cap 58. In addition, a plurality of steam discharge holes 58b are formed to pass through the cylinder cap 58 to allow the steam in the inner pot to flow outward and a fastening step 58a is formed along an outer periphery of the cylinder cap 58 to engage with a lower end edge of the D-cut hole. The steam discharge holes 58b may be arranged in a rotationally symmetrical configuration about the center of area of the cylinder cap 58 so that the cylinder cap 58 may be easily rotated using a snap ring plier or the like.

When the cylinder cap 58 is coupled to the D-cut coupling portion 53c, an edge of the D-cut hole is engaged between the fastening step 58a and a lower end of the lower cylinder 53, so that the lower cylinder 53 can be fixed. In addition, a gap between the lower end of the lower cylinder 53 and the edge of the D-cut hole can be sealed by the sealing O-ring 59. Accordingly, the steam in the inner pot can be stably introduced into the pressure switching passage 53a without leakage. The cylinder cap 58 may be integrally formed with the communication hole 81a of the lead plate 80.

As shown in FIG. 5, the lower cylinder 153 may be fixed to the mounting hole of the control plate 170. That is, since a screw thread is formed on an outer periphery of a fixing fastening portion 153c provided at a lower end of the lower cylinder 153 and a screw thread is formed in an inner periphery of the mounting hole 171a, the fixing fastening portion 153c may be fastened to the mounting hole 171a. An O-ring fixing step 153e supported on an edge of the mounting hole 171a may be provided on an outer periphery of an upper end of the fixing fastening portion 153c. When the fixing fastening portion 153c is engaged with the inner periphery of the mounting hole 171a in a state that the sealing O-ring 159a is mounted on the lower portion of the O-ring fixing step 153e, a gap between the lower cylinder 153 and the mounting hole 171a can be sealed.

In addition, a sealing member 159b is disposed at a lower end of the fixing fastening portion 153c to seal a gap between edges of the fixing fastening portion 153c and the communication hole 181a and to fix the lower cylinder 153. Thus, the steam in the inner pot can be stably introduced toward the pressure switching passage without leakage, and the lower cylinder 153 and the pressure-responsive operating unit 90 may be collectively combined with one component and fixed thereto.

Further, the lower cylinder may be fixed by fitting the lower cylinder into the mounting hole 171a. In order to prevent steam leakage when the pressure switching passage communicates with the communication hole, the mounting positions of the sealing O-ring and the sealing member may be changed.

In addition, the lifting piston 52 is movably coupled to an upper portion of the lower cylinder 53, and the pressure switching passage 53a is opened and closed as the lifting piston 52 vertically moves.

The lifting piston 52 has a mounting plate portion 52a having a size greater than a size of the pressure switching passage 53a and mounted on an upper end of the lower cylinder 53, and has upper and lower slide tube portions 52c and 52b extending in the vertical direction from an outer end of the mounting plate portion 52a.

A shielding protrusion 52f configured to shield the pressure switching passage 53a is provided on a lower surface of the mounting plate portion 52a and a plurality of arc-shaped switching discharge holes 52e, which are divided along an outer contour of the shielding protrusion 52f, are formed to pass through the lower surface of the mounting plate portion 52a.

That is, an upper end of the pressure switching passage 53a is sealed by the shielding protrusion 52f when the lifting piston 52 moves downward, and the shielding protrusion 52f is spaced apart from an upper end of the pressure switching passage 53a when the lifting piston 52 moves upward so that the steam in the inner pot may ascend by passing through the switching discharge hole 52e.

In addition, the upper cylinder 51 having a hollow cylindrical shape passes through the upper perforation portion 13a. A space between the upper cylinder 51 and the upper perforation portion 13a is sealed by a tubular sealing member 57, and a ring-shaped sealing groove 51c is recessed in an outer periphery of an upper end of the upper cylinder 51, so that a sealing protrusion 57a provided at an inner periphery of the tubular sealing member 57 can be hooked and supported in the ring-shaped sealing groove 51c.

Arc-shaped column fastening portions 51b are provided at a lower end of the upper cylinder 51, and a screw thread is formed on inner peripheries of the column fastening portions 51b. As the column fastening portions 51b are fastened to a screw thread formed on an upper outer periphery 53d of the lower cylinder 53 by passing through the switching discharge hole 52e, the upper cylinder 51 can be fixed to the lower cylinder 53. The column fastening portion 51b may have a size smaller than that of a sectional area of the switching discharge hole 52e to ensure a steam flow area when the lifting piston 52 moves upward.

An anti-scattering plate 51f may protrude radially inward from an inner periphery of the upper cylinder 51. The anti-scattering plate 51f may be formed at a position spaced from an upper surface of the switching discharge hole 52e when the lifting piston 52 moves upward and have a size covering the switching discharge hole 52e.

Thus, the steam can be smoothly discharged when a pressure switching unit 50 is opened, and it is possible to prevent water condensed on an inner surface of the pressure switching passage 53a from being scattered and discharged together with the steam. Therefore, an accident, such as burns caused by scattered moisture, can be prevented and contamination on a surface of the lid 10 or an interior of the steam cap portion 60 caused by sticky rice water can be minimized, so that the electric cooker can be used safely and cleanly.

Meanwhile, the lower slide tube portion 52b has an inner diameter greater than an outer diameter of an upper portion of the lower cylinder 53 and the upper slide tube portion 52c has an inner diameter greater than an outer diameter of a lower portion of the upper cylinder 51. Therefore, the lifting piston 52 may be mounted to surround an outer periphery of the lower cylinder 53 and an outer periphery of the upper cylinder 51.

Thus, the slide tube portions 52b and 52c are guided along the outer peripheries of the upper and lower cylinders 51 and 53 so that the lifting piston 52 may vertically move in the correct direction and the opened and closed states of the pressure switching passage can be stably switched.

In addition, ring-shaped sealing grooves 51d and 53b are recessed in a lower outer periphery of the upper cylinder 51 and an upper outer periphery of the lower cylinder 53 to mount the sealing members 55 and 56.

A plurality of sealing ribs 55a and 56a may protrude from outer peripheries of the sealing members 55 and 56. Accordingly, even when the lifting piston 52 moves upward or downward, spaces between the slide tube portions 52b and 52c and between the cylinders 51 and 53 can be accurately sealed.

Further, since inner peripheries of the upper and lower ends of the lifting piston 52 are supported by end portions of the sealing ribs 55a and 56a, the radial movement is minimized so that the lifting piston 52 can more accurately vertically move. Accordingly, the shielding protrusion 52f and the pressure switching passage 53a can be concentrically aligned, so that the pressure switching passage 53a can be accurately opened and closed.

Meanwhile, a lifting blade portion 52d may protrude radially outward from an outer periphery of the lower slide tube portion 52b. The lifting blade portion 52d is pressed downward by the pressing unit so that the pressure switching passage 53a can be maintained in a closed state.

The pressing unit may be provided as an elastic member 54, such as a spring having an elastic modulus corresponding to the abnormal pressure so that the pressure switching passage 53a is forcibly opened at a predetermined abnormal pressure or above.

In detail, a spring support protrusion 51a is provided on an outer periphery of the upper cylinder 51 and a washer member 51e having a size greater than a diameter of the elastic member 54 is attached to a lower end of the spring support protrusion 51a. The washer member 51e may be integrally formed with the spring support protrusion 51a, and the spring support protrusion 51a may have an area corresponding to the diameter of the elastic member 54.

Since the elastic member 54 is interposed between the lifting blade portion 52d and the washer member 51e, the shielding protrusion 52f and the pressure switching passage 53a can be maintained in a close contact state.

As shown in FIG. 4, the pressing unit may be provided in the form of a pressure load pendulum 154 having a weight corresponding to the abnormal pressure and coupled to an outer periphery of the lifting piston 152. The pressure load pendulum 154 may have a ring shape and may be mounted on an upper surface of the lifting blade portion 152d or be integrally formed with the lifting blade portion 152d.

The abnormal pressure may be set to a level greater than the internal pressure of the inner pot controlled by the pressure-responsive operating unit 90 in the pressure cooking mode.

That is, when the internal pressure of the inner pot is controlled by the pressure-responsive operating unit 90 in a state that the pressure switching passage 53a is closed, the lifting piston 52 is maintained in a descend state due to the downward pressing force of the pressing units 54 and 154, and the pressure switching passage 53a is closed.

When the internal pressure of the inner pot is excessively increased due to a control error or a failure of the pressure-responsive operating unit 90, the shielding protrusion 52f may ascend due to the increased steam pressure, thereby forcefully opening the pressure switching passage 53a. Thus, an accident caused by excessive pressure increase in the inner pot can be prevented.

The pressure switching passage 53a may be configured to be narrowed radially inward toward in the upward direction. Accordingly, a pressure area of the steam with respect to the shielding protrusion 52f can be reduced, and the pressure required for the pressing unit 54 to maintain the descend state of the lifting piston 52 can be reduced.

The shielding protrusion 52f may be configured to be narrowed radially inward in the downward direction and an expanded sealing contact portion 53f, which is expanded radially outward in the upward direction, is provided at an upper end of the pressure switching passage 53a. Accordingly, an inclined lower surface of the shielding protrusion 52f comes into surface-contact with an inclined inner surface of the sealing contact portion 53f when the lifting piston 52 moves downward, so that the accurate contact can be achieved.

Meanwhile, the pressure switching unit 50 may be disposed adjacent to an inner periphery of the locking ring 20.

In addition, a lift protrusion portion 24, which is gradually inclined upward in the locking rotational direction of the locking ring 20, may protrude from an upper surface of the locking ring 20 along a portion facing the lifting blade portion 52d which protrudes from an outer periphery of the pressure switching unit 50.

In detail, referring to FIGS. 1 to 3A, the pressure switching unit 50 is arranged such that the lifting blade portion 52d of the lifting piston 52 faces the upper surface of the locking ring 20.

The lift protrusion portion 24 may be formed along an inner peripheral edge of the upper surface of the locking ring 20, which faces the lifting blade portion 52d when the locking ring 20 is rotated to be locked or unlocked, and is gradually inclined upward in the locking rotational direction.

That is, the lift protrusion portion 24 has a low projecting height at a portion facing a lower surface of the lifting blade portion 52d in the locked state of the locking ring 20, and has a high projecting height at the portion facing the lower surface of the lifting blade portion 52d in the unlocked state of the locking ring 20. In detail, when the locking ring 20 is rotated to be locked, a height of a lowermost step 24a of the lift protrusion portion 24 facing the lifting blade portion 52d is set such that the shielding protrusion 52f moves downward to close the pressure switching passage 53a.

In addition, when the locking ring 20 is rotated to be unlocked, a height of an uppermost step 24b of the lift protrusion portion 24 facing the lifting blade portion 52d is set such that a sufficient steam flowing area can be formed between the shielding protrusion 52f and the pressure switching passage 53a.

Accordingly, the opened/closed states of the pressure switching unit 50 can be switched corresponding to the rotation of the locking ring 20.

That is, as shown in FIGS. 2A and 3A, when the locking ring 20 is rotated in the unlocking rotational direction in a state that the locking ring 20 is locked, the lifting blade portion 52d slides upward along an inclined surface of the lift protrusion portion 24.

A lower end edge 52g of the lifting blade portion 52d may be rounded to allow the lift protrusion portion 24, which is in contact with the locking ring 20 when the locking ring 20 is rotated, to smoothly slide.

In addition, when the lifting blade portion 52d is supported by the uppermost step 24b of the lift protrusion portion 24, the pressure switching passage 53a can be completely opened and the opened state can be maintained.

In this case, the steam in the inner pot can be discharged to the outside through the steam flow hole, the steam discharge hole 58b, the communication hole 81a, the pressure switching passage 53a, the switching discharge hole 52e, a hollow of the upper cylinder 51, and the steam cap portion 60. Accordingly, the cooking can be performed in the non-pressure cooking mode in which the steam in the inner pot is continuously discharged and the internal pressure of the inner pot is not increased.

In addition, as shown in FIGS. 2B and 3B, when the locking ring 20 is rotated in the locking direction in a state that the locking ring 20 is unlocked, the lifting blade portion 52d slides down along the inclined surface of the lift protrusion portion 24.

When the lifting blade portion 52d faces the lowermost step 24a of the lift protrusion portion 24, upward pressure on the lifting blade portion 52d is released so that the lifting piston 52 moves downward and the pressure switching passage is completely closed.

In this case, since the descended state of the lifting piston 52 is maintained by the pressing unit 54, the steam in the inner pot flows to the pressure-responsive operating unit 90 through the steam flow hole, and is selectively discharged depending on the level of the internal pressure of the inner pot, so that the internal pressure of the inner pot can be maintained at a constant level.

That is, since the internal pressure of the inner pot is increased in a state that the pressure switching unit 50 is closed, the cooking can be performed in the pressure cooking mode. When the internal pressure of the inner pot is increased higher than a predetermined level, the steam in the inner pot can be discharged to the outside through the steam flow hole, the pressure-responsive operating unit 90, and the steam cap portion 60.

In this manner, since the non-pressure cooking mode for cooking a food without pressure and the pressure cooking mode for cooking a food with high pressure, such as pressure rice cooking, can be easily switched according to the opening and closing of the pressure switching unit 50, various recipes can be freely used with one cooking device. In addition, since a food may be cooked according to the user's taste, such as cooking a unique sticky texture of pressure cooked rice or a unique soft texture of non-pressure cooked rice, the compatibility of the product and the cooking quality can be improved.

Further, since the pressure safety device is not driven in the non-pressure cooking mode, the lid 10 can be freely opened and closed so that the input of additional material and checking of cooking conditions can be easily performed during cooking, thereby improving the convenience of use for the product.

In addition, as the handle portion 11 is rotated, the locking ring 20 is rotated to switch the opening/closing states of the pressure switching unit 50, so the non-pressure cooking mode and the pressure cooking mode can be easily selected in use and the convenience of use for the product can be significantly improved. Further, since the handle portion can interwork with the pressure switching unit 50 through the simple protrusion structure protruding from the locking ring 20 without additional components, the number of components can be reduced and the interconnection structure between the components can be simplified, so that the productivity and assembling work for the product can be improved.

In addition, the steam in the inner pot can be quickly discharged through a wide flow path formed in the pressure switching unit 50 by simply rotating the handle portion 11 in the unlocking direction. Therefore, a conventional structure, such as a tumbler pin, for forcibly opening the pressure relief valve 90a in order to remove the residual pressure in the inner pot may be omitted. Further, in the non-pressure cooking mode, the steam exhaust noise generated from the pressure relief valve 90a during the cooking may be removed, so the qui quietness of the product can be improved.

Figure 7:
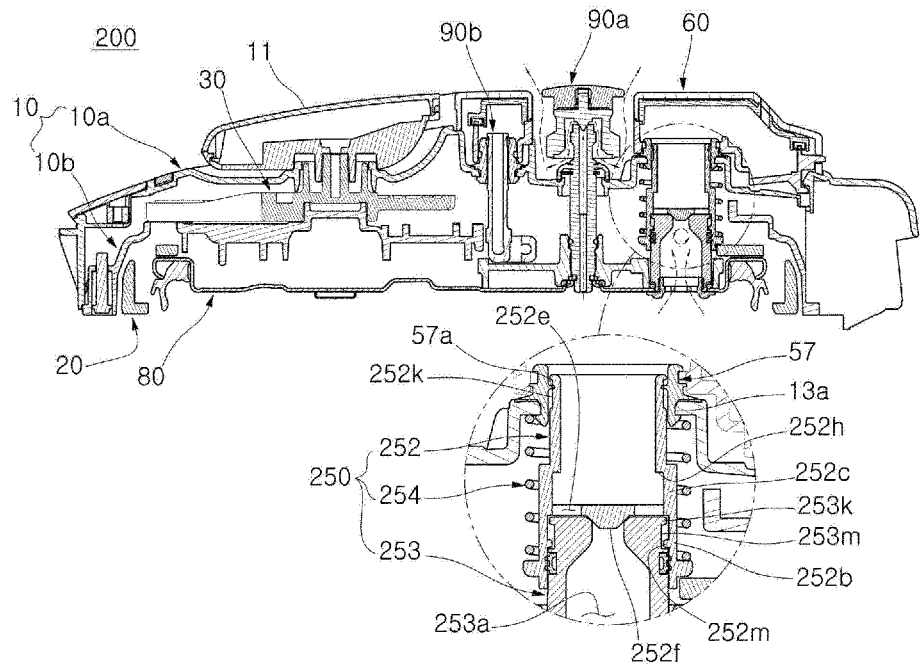
FIG. 7 is a sectional view illustrating a lid of an electric cooker according to a second embodiment of the present disclosure.

FIG. 7 is a sectional view illustrating a lid of an electric cooker according to a second embodiment of the present disclosure. In the second embodiment, the basic configuration except for the shape of the lifting piston 252 is the same as that of the first embodiment described above, so a detailed description of the same configuration will be omitted, and the same configurations will be denoted by the same reference numerals.

As shown in FIG. 7, a pressure switching unit 250 may include a lower cylinder 253, a lifting piston 252, and a pressing unit. The lifting piston 252 is disposed to pass through an upper perforation portion 13a, and is coupled to an upper portion of the lower cylinder 253 to vertically move.

In detail, a tap assembling protrusion 252m protrudes from a lower inner periphery of a lower slide tube portion 252b, and a tap fitting protrusion 253k and a protrusion receiving groove 253m are formed on an outer periphery of an upper end of the lower cylinder 253.

The tap assembling protrusion 252m may be formed at an inner periphery thereof with a screw thread and the tap fitting protrusion 253k may be formed at an outer periphery thereof with a screw thread so that the tap assembling protrusion 252m can be coupled with the tap fitting protrusion 253k. The protrusion receiving groove 253m has a longitudinal width corresponding to a lifting distance of the lifting piston 252 along a lower portion of the tap fitting protrusion 253k.

That is, the tap assembling protrusion 252m moves downward while being rotatably coupled to the tap fitting protrusion 253k and may be inserted into the protrusion receiving groove 253m by passing through the screw thread of the tap fitting protrusion 253k. In this case, the tap assembling protrusion 252m may vertically move within a range from a lower end of the tap fitting protrusion 253k to an inside of the protrusion receiving groove 253m.

Accordingly, the lifting piston 252 is coupled to the upper portion of the lower cylinder 253 to vertically move and can be prevented from being separated from the lower cylinder 253 due to the steam being discharged when the pressure switching unit 250 is opened.

In addition, the upper slide tube portion 252c extends by passing through the upper perforation portion 13a. That is, the upper slide tube portion 252c may have a length allowing the upper slide tube portion 252c to be exposed to an upper side of the upper perforation portion 13a in a state that the shielding protrusion 252f is in close-contact with an upper end of the switching passage 253a.

In this case, the pressing unit may be provided as an elastic member 254 or a pressure load pendulum the same as in the first embodiment. When the pressing unit is provided as the elastic member 254, an upper end of the elastic member 254 can be supported on a lower edge of the upper perforation portion 13a.

In addition, a gap between the upper slide tube portion 252c and the upper perforation portion 13a is sealed by a tubular sealing member 57 and a ring-shaped sealing groove 252k is recessed in an outer periphery of an upper end of the upper slide tube portion 252c so that a sealing protrusion 57a provided at an inner periphery of the tubular sealing member 57 can be hooked and supported in the ring-shaped sealing groove 252k.

The sealing groove 252k may extend in the up/down direction corresponding to the lifting distance of the lifting piston 252. Accordingly, the sealing state between the sealing protrusion and the sealing groove 252k can be stably maintained even when the lifting piston 252 vertically moves.

When the lifting piston 252 moves upward, the steam in the inner pot can be discharged out of the lid 10 through a steam flow hole, a steam discharge hole 58b, a communication hole 81a, the pressure switching passage 253a, a switching discharge hole 252e, the upper slide tube portion 252c and a steam cap portion 60. An anti-scattering step portion 252h may be formed on an inner periphery of the upper slide tube portion 252c to cover an upper portion of the switching discharge hole 252e.

In this manner, an inside of the inner pot can communicate with an outside of the lid 10 without a separate upper cylinder (see reference numeral 51 in FIG. 1), and a sealing member (see reference numeral 55 in FIG. 1) configured to seal a gap between the upper cylinder and the upper slide tube portion 252c when the lifting piston 252 vertically moves can be omitted, so that the number of components can be reduced and the productivity and assembling work of the product can be improved.

The present disclosure provides the following effects.

First, since the non-pressure cooking mode for cooking a food without pressure and the pressure cooking mode for cooking a food with high pressure such as a pressure rice cooking can be easily switched according to the opening and closing of the pressure switching unit, various recipes can be freely used in one cooking device. In addition, since it is possible to cook a food according to the user's taste, such as a unique sticky texture of pressure cooked rice and a unique soft texture of non-pressure cooked rice, the compatibility of the product and the cooking quality can be improved.

Further, since the lid can be freely opened and closed in the non-pressure cooking mode without the limitation caused by the pressure safety device, the input of the additional material and the checking of the cooking condition can be easily performed during the cooking, thereby improving the convenience of use for the product.

Second, the control unit can determine whether the pressure switching unit is opened or closed through the sensing signal of the sensor unit according to the position of the marker when the locking ring is locked and unlocked, so that the cooking temperature control algorithm suitable for the non-pressure cooking mode and the pressure cooking mode switched according to the rotation of the handle portion can be automatically selected, thereby remarkably improving the convenience of use for the product and the cooking quality.

Third, since the opened/closed states of the pressure switching unit is switched corresponding to the rotation of the handle portion, the non-pressure cooking mode and the pressure cooking mode can be easily selected during use by simply rotating the handle portion, so that the convenience of use for the product can be significantly improved.

Fourth, since the link unit for interworking the handle portion and the pressure switching unit is provided with a simple protrusion structure protruding from the locking ring, the number of components can be reduced and the interconnection structure between the components can be simplified, so that the productivity and assembling work for the product can be improved.

Fifth, the pressing unit for maintaining the lifting piston in the descending state is configured to have an elastic force or a load corresponding to a preset abnormal pressure. Therefore, the pressure switching passage can be stably closed at the time of pressure cooking, and the pressure switching channel can be forcibly opened when the internal pressure of the inner pot is excessively increased due to the malfunction of the pressure-responsive operating unit, so that the safety of the product can be improved.

Sixth, since the switching discharge hole of the lifting piston is covered with the anti-scattering plate or the anti-scattering step, water condensed on the inner surface of the pressure switching passage can be prevented from being scattered and discharged together with the steam. Therefore, an accident caused by scattered moisture can be prevented and contamination on the lid or the steam cap portion caused by sticky rice water can be minimized, so that the electric cooker can be used safely and cleanly.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An electric cooker comprising:
   a main body provided, at an upper end thereof, with a flange portion and configured to accommodate an inner pot therein;
   a lid coupled to an upper portion of the main body and opened/closed by an opening/closing unit;
   a locking ring rotated by interworking with the opening/closing unit, selectively engaged with the flange portion, and provided, at an upper surface thereof, with a marker configured to indicate a rotational direction;
   a pressure switching unit arranged to pass through the lid and opened or closed by interworking with the opening/closing unit to discharge internal steam from the inner pot;
   a sensor unit configured to sense the marker when the locking ring is rotated to be locked or unlocked; and
   a control unit that activates a power supply to the main body when a sensing signal is received from the sensor unit,
   wherein the main body has a heating unit to heat the inner pot, and the control unit controls the heating unit such that the heating unit is driven according to a cooking command input through a control panel when the power supply to the main body is activated,
   wherein the control unit controls a cooking temperature of the inner pot through a control algorithm of a preset pressure cooking mode according to the cooking command input when the sensing signal corresponding to a locking rotation of the locking ring is received, and
   the control unit controls the cooking temperature of the inner pot through a control algorithm of a preset non-pressure cooking mode according to the cooking command input when the sensing signal corresponding to an unlocking rotation of the locking ring is received.

2. The electric cooker of claim 1, wherein the pressure switching unit comprises a communication member configured to communicate an inside of the inner pot with the outside, and an opening/closing member configured to maintain the communication member in one of opened/closed states by a pressure in a first direction, and
   opened/closed states of the opening/closing member are switched by a link unit that generates a pressure in a second direction opposite the first direction.

3. The electric cooker of claim 1, wherein the main body has an auxiliary locking unit configured to lock the lid such that the lid is selectively opened/closed when the locking ring is unlocked.

4. The electric cooker of claim 1, further comprising a pressure-responsive operating unit which is selectively opened/closed according to a pressure level in the inner pot in a pressure cooking mode in which the pressure switching unit is closed.

5. The electric cooker of claim 4, wherein a steam cap portion is detachably coupled to an upper surface of the lid to guide a steam discharged from the pressure-responsive operating unit and the pressure switching unit, and
   the pressure-responsive operating unit comprises a pressure relief valve including a solenoid valve, which is opened/closed according to an electric signal, and a weight which vertically moves corresponding to a steam pressure in the inner pot.

6. The electric cooker of claim 1, wherein the pressure switching unit is disposed adjacent to an inner periphery of the locking ring, and
   a lift protrusion portion, which is gradually inclined upward in a locking rotational direction of the locking ring, is provided on an upper surface of the locking ring along a portion facing a lifting blade portion protruding from an outer periphery of the pressure switching unit.

7. The electric cooker of claim 6, wherein the pressure switching unit comprises:
   a lower cylinder configured to pass through a lower surface portion of the lid and formed therein with a pressure switching passage communicating with an inside of the inner pot;
   a lifting piston having a lifting blade portion which protrudes from an outer periphery of the lifting piston and vertically moves along an inclined surface of a lift protrusion portion to switch opened/closed states of the pressure switching passage; and a pressing unit coupled to an upper portion of the lower cylinder to press the lifting blade portion such that the opened/closed states of the pressure switching passage is maintained.

8. The electric cooker of claim 7, wherein an edge of the lifting blade portion is rounded to allow the lifting blade portion to slidably move when the lifting blade portion comes into contact with the lift protrusion portion.

9. The electric cooker of claim 7, wherein the pressing unit comprises an electric member which is installed on an outer periphery of the lifting piston to forcibly open the pressure switching passage at a preset abnormal pressure or above and has an elastic modulus corresponding to the preset abnormal pressure.

10. The electric cooker of claim 7, wherein the pressing unit is a pressure load pendulum provided on an outer periphery of the lifting piston and having a weight corresponding to a preset abnormal pressure such that the pressure switching passage is forcibly opened at the preset abnormal pressure or above.

11. The electric cooker of claim 7, wherein the lifting piston comprises:
a mounting plate portion mounted on an upper end of the lower cylinder, in which a shielding protrusion configured to shield the pressure switching passage is formed on a lower surface of the mounting plate portion, and switching discharge holes are formed along an outer periphery of the shielding protrusion; and
a lower slide tube portion extending downward from an outer end of the mounting plate portion to surround an outer periphery of the lower cylinder.

12. The electric cooker of claim 11, wherein the shielding protrusion is configured to be gradually narrowed radially inward in a downward direction, and
a sealing contact portion is provided at an upper end of the pressure switching passage, in which the sealing contact portion is gradually expanded radially outward in an upward direction to come into contact with the shielding protrusion.

13. The electric cooker of claim 11, wherein the lifting piston further comprises an upper slide tube portion extending upward from an outer end of the mounting plate portion and arranged to pass through an upper surface of the lid, and
wherein an anti-scattering step portion is formed on an inner periphery of the upper slide tube portion to cover an upper portion of the switching discharge hole.

14. The electric cooker of claim 11, wherein the pressure switching unit further comprises an upper cylinder arranged to pass through an upper surface of the lid, and
wherein a column fastening portion, which extends downward while being divided in an arc shape so as to be fastened to the lower cylinder by passing through the switching discharge hole, is provided at a lower end of the upper cylinder.

15. The electric cooker of claim 14, wherein an anti-scattering plate is provided at an inner periphery of the upper cylinder and the anti-scattering plate protrudes radially inward to face the switching discharge hole.

16. The electric cooker of claim 14, wherein the lifting piston further comprises an upper slide tube portion extending upward from an outer end of the mounting plate portion to surround an outer periphery of the upper cylinder, and
a sealing member configured to seal an inner periphery of the upper slide tube portion is mounted on an outer periphery of the upper cylinder.

* * * * *